Oct. 21, 1930.  E. A. SPERRY  1,778,734
STABILIZING DEVICE
Filed July 18, 1925

Inventor
ELMER A. SPERRY.
By his Attorney
Hubert H. Thompson

Patented Oct. 21, 1930

1,778,734

UNITED STATES PATENT OFFICE

ELMER A. SPERRY, OF BROOKLYN, NEW YORK, ASSIGNOR, BY MESNE ASSIGNMENTS, TO SPERRY GYROSCOPE COMPANY, INC., A CORPORATION OF NEW YORK

STABILIZING DEVICE

Application filed July 18, 1925. Serial No. 44,505.

This invention relates to gyro stabilizers for use upon vehicles such as automobiles. It has for its object the steadying of bodies susceptible of movement, especially angular movement or movement about a point of axis, and consists in so mounting one or more gyroscopic appliances upon such body or vehicle as to derive therefrom opposing control, consisting in an effort opposite to a given motion which is of sufficient magnitude to extinguish such movement in whole or part.

To illustrate this invention, it is shown as being mounted upon a vehicle, in the instance where only one of such gyroscopic appliances is so mounted as to oppose effectively lateral tipping of the body or truck and thus prevent lateral vibration or sudden tilting of such vehicle.

More specifically my invention consists in providing novel and effective means for driving the rotor of the gyro stabilizer at a constant speed, limiting the rate of precession of the gyroscope to limit the degree of counter-torque delivered to the vehicle, limiting the degree of precessional movement, providing a mounting for the precessional frame which will take up errors in alignment, and other improvements to be set forth hereinafter.

In the accompanying drawings

Figure 1:
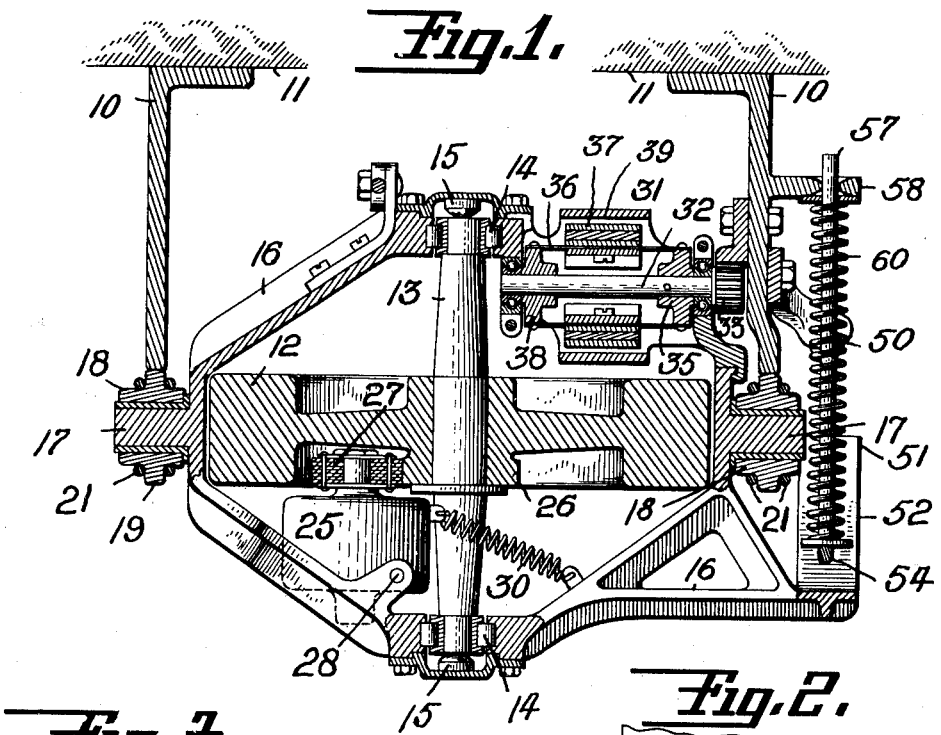
Fig. 1 is a vertical section through one form of gyro stabilizer for vehicles embodying my invention.

Referring to the drawings, I disclose my device as supported by brackets 10 upon the body of a vehicle 11. Said device may comprise a gyro rotor 12 fixed to a rotor shaft 13 journaled at its ends in roller bearings 14 and thrust bearings 15 within the precession casing or frame 16. Said frame may be provided with gudgeons 17 whereby it is supported within the brackets 10 by means of bearings 18. Each of said bearings may comprise a hub provided with a flange 19, said flange being adapted to seat within a slot 20 in the lower end of bracket 10 and held within said slot by means of a cord or flexible cable 21 which may be laced on both sides of said flange 19 above and below the hub and through the bracket 10. In this way errors in alignment of said mounting will be automatically corrected.

The gyro rotor 12 is of relatively small size for this purpose and requires a correspondingly small driving means. In this case an electric motor is employed, but since said motor cannot be mounted on the large rotor shaft 13, the motor 25 is shown as mounted on the precession frame 16 and having frictional engagement with the gyro rotor. The motor 25 is shown as geared to a hub 26 on the gyro rotor by means of a friction gear 27 carried at one end of the motor shaft. By this means temporary variations in speed of the motor will not affect the gyro rotor but will merely result in slipping in the friction drive. The motor 25 may be pivotally mounted at 28 on the precession frame and biased into engagement with the gyro rotor by one or more springs 30 to maintain the motor in resilient engagement with said rotor.

It will be understood that the device is so mounted that the axis of oscillation of the precession frame 16, that is, the axis through the trunnions 17, is positioned athwart the vehicle, that is, perpendicular to the longitudinal axis thereof. Lateral oscillation of the vehicle will cause said precession frame to oscillate on its gudgeons 17 and in so doing deliver a counter-torque.

Figure 3:
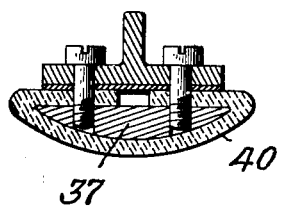
Fig. 3 is a cross section through one of the weights of the speed limiting device.

In order to limit the velocity of precession so that the stabilizing moments will not run too high, I may provide a speed-limiting device which may consist of a governor shown at 31 in Fig. 1 and geared to be driven by the relative speeds between the precession frame and the body or vehicle. The said speed limiting device 31 may be mounted in one portion of the precession frame which has a portion thereof broken away to permit the governor to be bolted into position in the space thus formed. Said speed limiting device in this instance may comprise a shaft 32 suitably journaled and carrying at one end a pinion 33 meshing with a rack 34 fixed to the brackets 10. Relative movement between the precession frame and the vehicle will thus rotate pinion 33 to rotate shaft 32. Said shaft has fixed thereto a hub 35 to which is attached a plurality of springs 36 carrying intermediate their length weights 37 and fixed at their opposite ends to a hub 38 slidably mounted upon said shaft 32. As the shaft 32 speeds up, the weights 37 will fly out and when a predetermined speed has been reached said weights will engage the cylindrical wall 39 of said governor to limit the speed. The detailed construction of these weights may be as shown in Fig. 3 comprising an outer layer of suitable brake lining material 40 surrounding the weight and clamped thereto.

Figure 2:
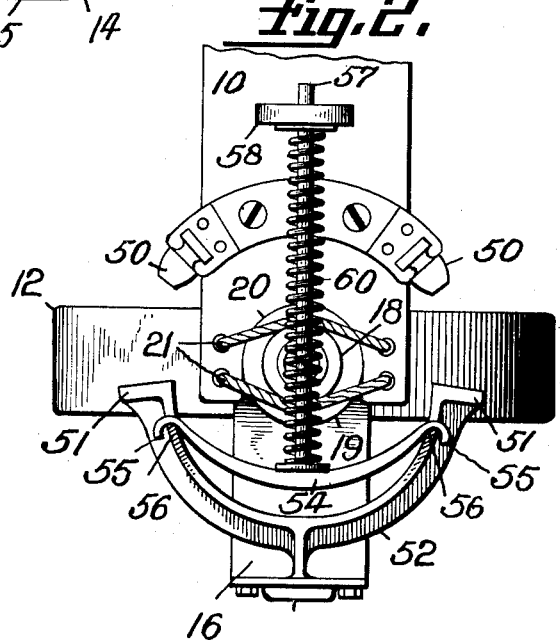
Fig. 2 is a side elevation of the Fig. 1 device.
Figure 4:
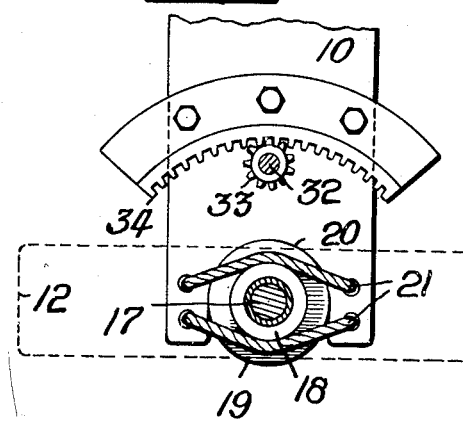
Fig. 4 is a side view of the Fig. 1 device with parts broken away to disclose the method of mounting the precession frame and the drive for the speed limiting device.

For limiting the degree of precessional movement of the said precession frame, I may provide suitable stops 50 (see Fig. 2) fixed to the vehicle (as, for example, to standard 10). The plugs may be of rubber and adapted to engage one or the other of projections 51 formed at the ends of a bracket 52 carried by the precession frame.

The stabilizing device is preferably substantially balanced, that is, has no appreciable pendulous factor and hence will require a restoring or centralizing means effective after each precessional movement to return the gyro rotor and precession frame to its original unprecessed position. For this purpose I may provide an element 54 which may take the general form of an anchor having arms 55 extending over and normally resting upon projections 56 on member 52 and having a central stem 57 extending upwardly through a guide bracket 58, which may be fixed to the bracket 10. A weak spring 60 is interposed between the guide bracket 58 and the member 54 so as normally to maintain the arms 55 on the stops 56. It will be apparent that precessional movement of the precession frame 16 in one direction or the other will cause the said spring 60 to be compressed and rod 57 to pass upwardly through guide block 58. When the precessional movement has ceased, however, the said spring 60 will cause arms 55 to press member 52 (and hence, the precession frame) towards its central or initial position.

In accordance with the provisions of the patent statutes, I have herein decsribed the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a stabilizer for vehicles, and the like, in combination, a gyro rotor, a precessional frame in which said rotor is mounted, means for mounting said frame on said vehicle to oppose movement thereof about a given axis, said means including bearings carried by said frame, and flexible cables connecting said bearings to said vehicle.

2. In a stabilizer for vehicles and the like, in combination, a gyro rotor, a precessional frame in which said rotor is mounted, said frame having a portion thereof broken away to form a space, and a speed limiting device mounted in said space.

3. In a stabilizer for vehicles and the like, in combination, a gyro rotor, a precessional frame in which said rotor is mounted, means for mounting said frame on said vehicle to oppose movement thereof about a given axis, said frame having a portion broken away to form a space, and means mounted in said space for limiting the speed of precession thereof.

4. In a stabilizer for vehicles and the like, in combination, a gyro rotor, a precessional frame in which said rotor is mounted, means for mounting said frame on said vehicle to oppose movement thereof about a given axis, and means for limiting the speed of precession of said frame, comprising a cylindrical member forming part of said frame, a plurality of rotatably mounted weights, means whereby said weights move outwardly towards the walls of said cylinder in response to the centrifugal force, and means whereby said weights are rotated in accordance with the speed of said frame relative to said vehicle.

5. In a stabilizer for vehicles and the like, in combination, a gyro rotor, a precessional frame in which said rotor is mounted, means for mounting said frame on said vehicle to oppose movement thereof about a given axis, a spring-pressed member adapted to engage said frame on opposite sides of the axis of precession so that precession in either direction will actuate said member against the action of said spring-pressed member whereby said frame is returned to central position.

6. In a stabilizer for vehicles and the like, in combination, a gyro rotor, a precessional frame in which said rotor is mounted, means for mounting said frame on said vehicle to oppose movement thereof about a given axis, projections carried by said frame on opposite sides of the axis of precession, a spring-pressed member adapted to engage said projections so that precession in either direction will actuate said member against the action of said spring-pressed member whereby said frame is returned to central position.

In testimony whereof I have affixed my signature.

ELMER A. SPERRY.